United States Patent
Chien (10) Patent No.: US 9,442,579 B2
(45) Date of Patent: Sep. 13, 2016

(54) TOUCH DEVICE WARNING METHOD AND TOUCH DEVICE WARNING SYSTEM

(71) Applicant: Primax Electronics Ltd., Neihu, Taipei (TW)

(72) Inventor: Chien-Pang Chien, Taipei (TW)

(73) Assignee: Primax Electronics Ltd., Taipei (TW)

( * ) Notice: Subject to any disclaimer, the term of this patent is extended or adjusted under 35 U.S.C. 154(b) by 346 days.

(21) Appl. No.: 14/084,314

(22) Filed: Nov. 19, 2013

(65) Prior Publication Data

US 2015/0091817 A1    Apr. 2, 2015

(30) Foreign Application Priority Data

Sep. 27, 2013 (TW) .............................. 102135104 A (51) Int. Cl.
*G06F 3/0354* (2013.01)
*G06F 1/16* (2006.01)
*G06F 9/44* (2006.01)

(52) U.S. Cl.
CPC ......... *G06F 3/03545* (2013.01); *G06F 1/1626* (2013.01); *G06F 1/1684* (2013.01); *G06F 9/4443* (2013.01); *G06F 2200/1632* (2013.01)

(58) Field of Classification Search
CPC .............. G06F 1/1626; G06F 1/1684; G06F 2200/1632; G06F 9/4443; G06F 3/03545
USPC ....................................... 345/179; 178/19.01
See application file for complete search history.

(56) References Cited

U.S. PATENT DOCUMENTS

| | | | | |
|---|---|---|---|---|
| 5,635,959 A * | 6/1997 | Takeuchi | .............. | G06F 1/1626 178/19.01 |
| 6,068,307 A * | 5/2000 | Murphy | ................ | G06F 1/1616 292/300 |
| 6,114,958 A * | 9/2000 | Murphy | ................ | G06F 1/1616 200/61.59 |
| 6,681,333 B1 * | 1/2004 | Cho | ...................... | G06F 1/1626 345/179 |
| 6,819,557 B2 * | 11/2004 | Lilenfeld | ............ | G06F 3/03545 345/179 |

(Continued)

FOREIGN PATENT DOCUMENTS

JP    2009289045 A   * 12/2009

OTHER PUBLICATIONS

Maezawa, Translation of JP 2009-289045, Dec. 10, 2009.*

*Primary Examiner* — Dmitriy Bolotin
(74) *Attorney, Agent, or Firm* — Kirton McConkie; Evan R. Witt (57) ABSTRACT

A touch device warning method and a touch device warning system are provided. The touch device warning method provides multiple judgment mechanisms. The multiple judgment mechanisms include the mechanism of judging whether a touch device is triggered by a touch pen, the mechanism of judging whether the touch device is moved and the mechanism of judging whether an untouched time period of the touch pen and the touch device exceeds a predetermined time. Once the conditions of the judgment mechanisms are satisfied, the touch device warning method warns the user of taking back the touch pen. Consequently, the possibility of losing the touch pen is reduced, and the occurrence of the erroneous judgment is avoided.

6 Claims, 6 Drawing Sheets

(56) References Cited

U.S. PATENT DOCUMENTS

| | | | | |
|---|---|---|---|---|
| 7,522,158 B2* | 4/2009 | Carlson | ............... | G06F 1/1626 342/465 |
| 7,994,913 B2* | 8/2011 | Lee | ............... | G08B 21/24 340/529 |
| 8,362,910 B2* | 1/2013 | Lee | ............... | G06F 1/30 340/636.1 |
| 2005/0162412 A1* | 7/2005 | Ronkko | ............... | G06F 3/03545 345/179 |
| 2005/0264536 A1* | 12/2005 | Kyrola | ............... | G06F 1/1616 345/173 |
| 2005/0270167 A1* | 12/2005 | Lai | ............... | G06F 21/83 340/687 |
| 2006/0174139 A1* | 8/2006 | Keely | ............... | G06F 1/3203 713/300 |
| 2008/0055278 A1* | 3/2008 | Locker | ............... | G06F 3/041 345/179 |
| 2009/0128521 A1* | 5/2009 | Chen | ............... | G06F 1/1626 345/179 |
| 2009/0295573 A1* | 12/2009 | Lee | ............... | G08B 21/24 340/540 |
| 2014/0180481 A1* | 6/2014 | Park | ............... | G06F 3/0487 700/275 |
| 2014/0192031 A1* | 7/2014 | Je | ............... | G06F 1/3218 345/179 |
| 2015/0058740 A1* | 2/2015 | Asahi | ............... | G08C 17/02 715/740 |

* cited by examiner

TOUCH DEVICE WARNING METHOD AND TOUCH DEVICE WARNING SYSTEM

FIELD OF THE INVENTION

The present invention relates to a touch device warning method, and more particularly to a touch device warning method for a touch device and a touch pen.

BACKGROUND OF THE INVENTION

Generally, a touch device comprises a touch screen. By touching the touch screen with the user's finger, the touch device is operated to execute a corresponding function. The widely-used touch device includes for example a smart phone, a tablet computer, a personal digital assistant (PDA), a navigation device, or the like. When the user operates the touch device by touching the touch screen with the finger, the fingerprint is usually retained on the touch screen. The fingerprint may hinder the user from viewing the touch screen.

For solving the above drawbacks, a touch pen is introduced into the market. By holding the touch pen and tapping the touch pen on the touch screen, the touch device can be operated while maintaining the cleanness of the touch screen. Moreover, for most of the touch devices, a handwriting input interface is provided for allowing the user to input characters in a handwriting manner. Since the way of inputting characters by using the touch pen is similar to the common handwriting way, the use of the touch pen to input characters may facilitate the user to input characters in the handwriting manner.

However, after the touch pen is used, the user may usually place the touch pen at random. Consequently, the possibility of losing the touch pen is very high. Conventionally, two approaches are provided in order to avoid the problem of losing the touch pen. The first approach uses a physical rope. A first end of the physical rope is connected with the touch pen, and a second end of the physical rope is connected with the touch device. Although the first approach can avoid the problem of losing the touch pen, the appearance is not aesthetically pleasing.

A second approach is a warning method for reminding the user that the touch pen is lost. The warning method is disclosed in Chinese Patent No. CN101692183 for example. The touch device disclosed in Chinese Patent No. CN101692183 comprises a touch pen slot for accommodating the touch pen. Firstly, the warning method detects whether the touch pen is separated from the touch pen slot in order to judge whether the touch pen is well stored. If the touch pen is separated from the touch pen slot, the warning method starts to count time. Then, the warning method comprises a step of judging whether the touch pen is contacted with a touch screen of the touch device in a preset time interval. If the touch pen is not contacted with a touch screen of the touch device, the warning method comprises a step of judging whether the touch pen is contacted with the touch pen slot. If the touch pen is not contacted with the touch pen slot, the touch device warns the user that the touch pen is lost. The warning method, however, still has some drawbacks. For example, after the touch pen is used, if the touch pen is not stored within the touch pen slot but placed beside the touch device, the touch device still issues the warning message. Under this circumstance, the erroneous judgment occurs. The erroneous judgment may confuse the user.

Therefore, there is a need of providing an improved touch device warning method in order to avoid occurrence of erroneous judgment.

SUMMARY OF THE INVENTION

An object of the present invention provides a touch device warning method and a touch device warning system in order to avoid occurrence of erroneous judgment.

In accordance with an aspect of the present invention, there is provided a touch device warning method for a touch device. The touch device is in wireless communication with a touch pen. The touch device warning method includes the following steps. Firstly, a judging step is performed to judge whether the touch device is triggered by the touch pen. If the touch device is not triggered by the touch pen, another judging step is performed to judge whether the touch device is moved. If the touch device is moved, a warning signal is issued.

In accordance with another aspect of the present invention, there is provided a touch device warning method for a touch device. The touch device is in wireless communication with a touch pen. The touch device warning method includes the following steps. Firstly, a judging step is performed to judge whether the touch pen is in a proximity range of the touch device. If the touch pen is not in the proximity range of the touch device, a judging step is performed to judge whether the touch device is moved. If the touch device is moved, a warning signal is issued.

In accordance with a further aspect of the present invention, there is provided a touch device warning system. The touch device warning system includes a touch pen and a touch device. The touch device is in wireless communication with the touch pen. When the touch device is triggered by the touch pen, the touch device generates an operation signal. The touch device includes a tilt sensor, a warning unit, and a controlling unit. The tilt sensor is disposed within the touch device for detecting a tilt status of the touch device. The warning unit is used for issuing a warning signal. The controlling unit is connected with the tilt sensor and the warning unit. According to an operation status of the touch screen triggered by the touch pen and the tilt status of the touch device detected by the tilt sensor, the controlling unit determines whether the warning signal is outputted or not.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For eliminating the drawbacks of the conventional technology, the present invention provides a touch device warning method and a touch device warning system.

Figure 1:
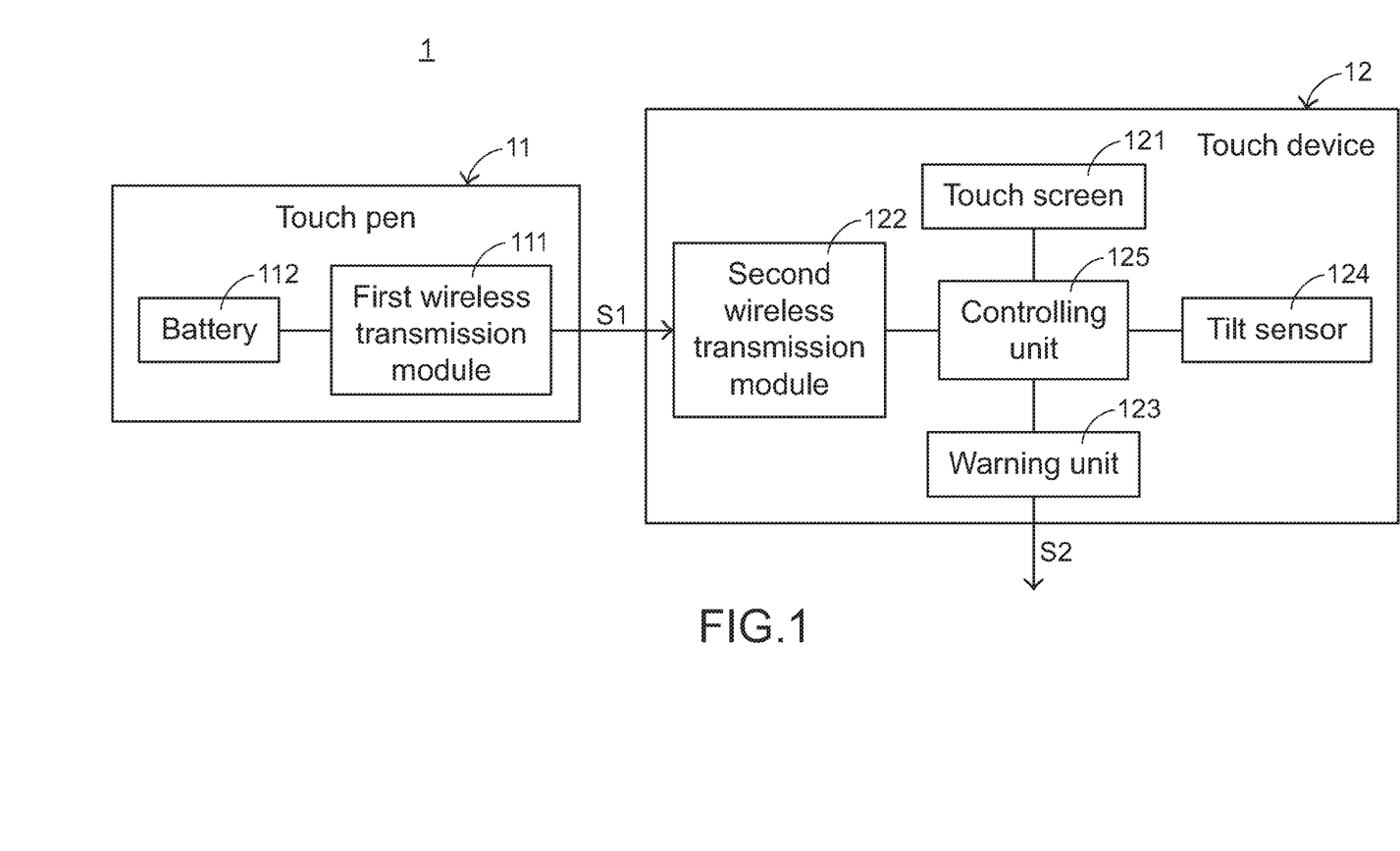
FIG. 1 is a schematic functional block diagram illustrating the architecture of a touch device warning system according to a first embodiment of the present invention.

The architecture of a touch device warning system of the present invention will be illustrated as follows. FIG. 1 is a schematic functional block diagram illustrating the architecture of a touch device warning system according to a first embodiment of the present invention. As shown in FIG. 1, the touch device warning system 1 comprises a touch pen 11 and a touch device 12. The touch pen 11 comprises a first wireless transmission module 111 and a battery 112. The first wireless transmission module 111 is disposed within the touch pen 11 and connected with the battery 112 in order to issue a wireless signal S1 to the touch device host 12. The battery 112 is used to provide electric power for operating the touch pen 11. The touch device 12 is in wireless communication with the first wireless transmission module 111 of the touch pen 11. When the touch device 12 is triggered by a user's finger or the touch pen 12, an operation signal (not shown) is generated. The touch device 12 comprises a touch screen 121, a second wireless transmission module 122, a warning unit 123, a tilt sensor 124, and a controlling unit 125. The touch screen 121 is installed in the touch device 12 and partially exposed outside the touch device 12. The touch screen 121 comprises an operation module (not shown). When the touch device 12 is triggered by the user's finger or the touch pen 12, the operation module generates the corresponding operation signal. The second wireless transmission module 122 is disposed within the touch device 12 and connected with the controlling unit 125. The second wireless transmission module 122 is in wireless communication with the first wireless transmission module 111 for receiving the wireless signal S1. In this embodiment, both of the first wireless transmission module 111 and the second wireless transmission module 122 are Bluetooth transmission modules.

The warning unit 123 is disposed within the touch device 12 and connected with the controlling unit 125 for issuing a warning signal S2. The tilt sensor 124 is disposed within the touch device 12 and connected with the controlling unit 125 for detecting a tilt status of the touch device 12. The controlling unit 125 is connected with the touch screen 121, the second wireless transmission module 122, the warning unit 123 and the tilt sensor 124. According to the operation status of the touch screen 121 triggered by the touch pen 11 and the tilt status of the touch device 12 detected by the tilt sensor 124, the controlling unit 125 will determine whether the warning unit 123 has to be controlled to issue the warning signal S2. In this embodiment, the warning unit 123 is a speaker, the tilt sensor 124 is a gyroscope, and the controlling unit 125 is a firmware component for implementing various judging and controlling functions. Alternatively, in some other embodiments, the warning unit is a light source, and the warning signal generated by the light source is flickering light.

More especially, the controlling unit 125 can judge whether the touch screen 121 is triggered by the user's finger or the touch pen 11. For example, when the touch screen 121 is touched by the touch pen 11, a pressing signal in response to the touch of the touch pen 11 on the touch screen 121 is detected by a pressure sensor (not shown) inside the touch pen 11. In addition, the pressing signal is transmitted from the first wireless transmission module 111 to the touch device 12. According to the pressing signal, the controlling unit 125 of the touch device 12 judges that the touch screen 121 is touched by the touch pen 11. On the other hand, when the touch screen 121 is touched by the user's finger, the pressing signal fails to be received by the touch device 12. Under this circumstance, the controlling unit 125 judges that the touch screen 121 is touched by the user's finger.

Figure 2:
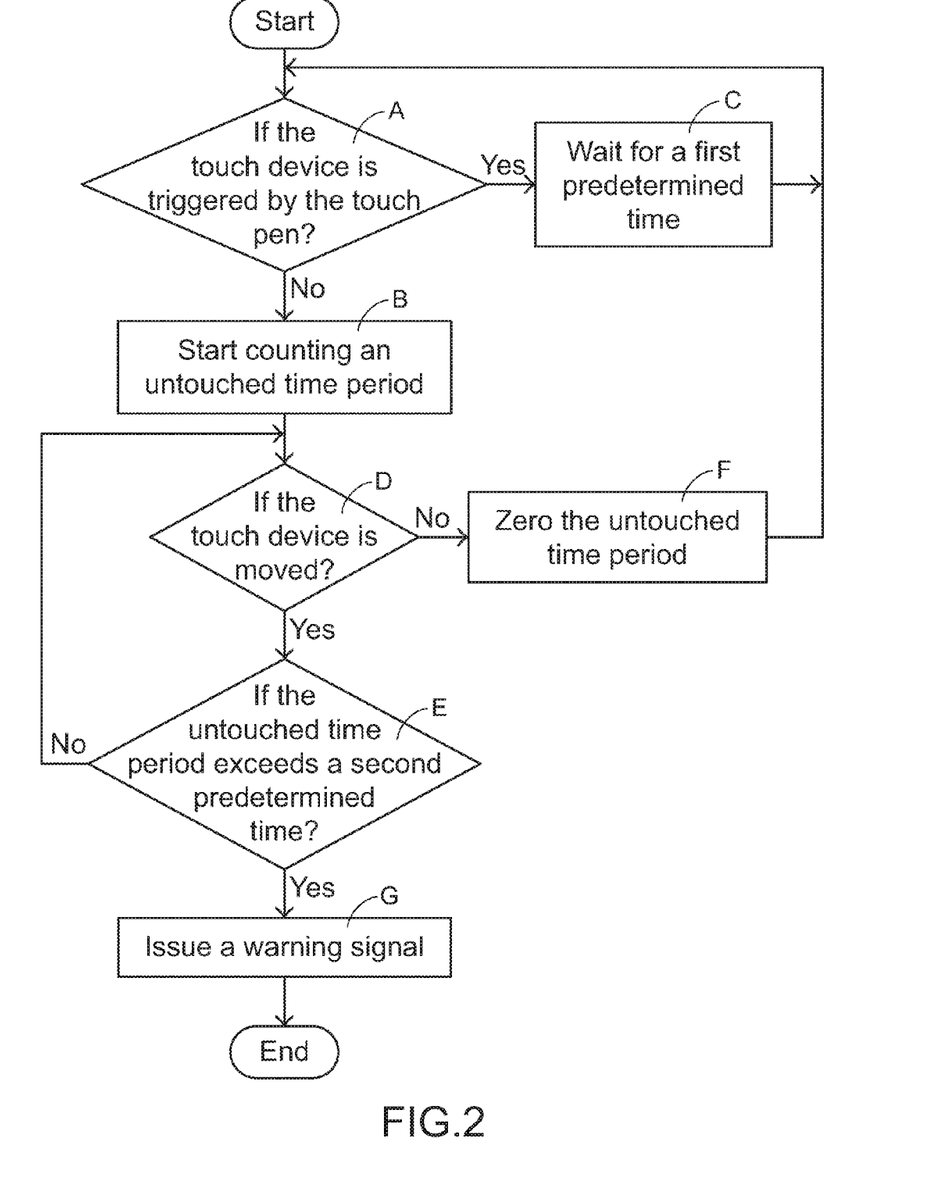
FIG. 2 is a flowchart illustrating a touch device warning method according to a first embodiment of the present invention.

Hereinafter, a touch device warning method according to a first embodiment of the present invention will be illustrated with reference to FIGS. 1 and 2. FIG. 2 is a flowchart illustrating a touch device warning method according to a first embodiment of the present invention. The touch device warning method according to the first embodiment of the present invention comprises the following steps:

Step A: judge whether the touch device is triggered by the touch pen;
Step B: start counting an untouched time period;
Step C: wait for a first predetermined time;
Step D: judge whether the touch device is moved;
Step E: judge whether the untouched time period exceeds a second predetermined time;
Step F: zero the untouched time period; and
Step G: issue a warning signal.

Please refer to FIG. 2 again. In the step A, if the touch device is triggered by the touch pen, the step C is performed. Whereas, if the touch device is not triggered by the touch pen, the step B is performed. In the step D, if the touch device is not moved, the step F is performed. Whereas, if the touch device is moved, the step E is performed. In the step E, if the untouched time period does not exceed the second predetermined time, the step D is performed again. Whereas, if the untouched time period exceeds the second predetermined time, the step G is performed.

In accordance with the touch device warning method of the present invention, the following possible situations of losing the touch pen 11 are taken into consideration. For example, after the touch device 12 is touched by the touch pen 11, if the user places the touch pen 11 at random, the user may easily forget the location of the touch pen 11. In addition, when the user leaves, the user often remembers to carry the larger touch device 12 but forgets to carry the smaller touch pen 11. Consequently, in the touch device warning method of the present invention, the step A, the step D and the step E are provided to judge whether the user forgets to carry the touch pen 11.

The operations of the touch device warning method implemented by the touch device warning system according to the first embodiment of the present invention will be illustrated in more details as follows. Please refer to FIGS. 1 and 2 again. When the user employs the touch pen 11 to touch the touch screen 121 in order to operate the touch device 12, the touch device warning method is started. According to the operation signal generated by the touch screen 121, the controlling unit 125 judges whether the touch device 12 is triggered by the touch pen 11 (i.e. the step A). Meanwhile, the controlling unit 125 realizes that the touch screen 121 is triggered by the touch pen 11, and thus the controlling unit 125 judges that the touch device 12 is operated by the user with the touch pen 11 now. Consequently, the step C of waiting for a first predetermined time (e.g. 2 seconds) is performed by the controlling unit 125, and then the step A is repeatedly done.

The step A and the step C are repeatedly done by the controlling unit 125 until the user stops touching the touch screen 121 with the touch pen 11. Meanwhile, the controlling unit 125 judges that the touch pen 11 is separated from the touch device 12 and is possibly placed by the user at random. Consequently, the step B of starting counting an untouched time period is performed by the controlling unit 125. In this context, the term "untouched time period" denotes the time duration that the touch screen 121 is not touched by the touch pen 11. Then, the tilt status of the touch device 12 is detected by the tilt sensor 124. According to the tilt status of the touch device 12 detected by the tilt sensor 124, the controlling unit 125 judges whether the touch device 12 is moved (i.e. the step D). If the tilt sensor 124 detects that the touch device 12 is not tilted, the controlling unit 125 judges that the touch device 12 is not moved. Consequently, the step F of zeroing the untouched time period is performed by the controlling unit 125, and then the step A is repeatedly done.

Moreover, a default tilt status has been previously stored in the controlling unit 125. The default tilt status is the tilt status that simulates a special rocking action of the user when walking forwardly and taking steps alternately with both feet. By comparing the current tilt status of the touch device 12 with the default tilt status, the controlling unit 125 judges whether the touch device 12 is moved. If the current tilt status of the touch device 12 complies with the default tilt status, the controlling unit 125 judges that the touch device 12 is moved.

In case that the touch device 12 is not moved by the user, the step A, the step B, the step D and the step F are repeatedly done by the controlling unit 125 until the touch device 12 is carried and moved by the user. When the user goes out and carries the touch device 12 by holding the touch device 12 with one hand or placing the touch device 12 in a bag, the tilt status of the touch device 12 is detected by the tilt sensor 124. By comparing the current tilt status of the touch device 12 with the default tilt status, the controlling unit 125 judges whether the touch device 12 is moved. Since the current tilt status of the touch device 12 complies with the default tilt status, the controlling unit 125 judges that the touch device 12 is moved. Then, the step E of judging whether the untouched time period exceeds the second predetermined time is performed. For example, the second predetermined time is 5 second.

If the controlling unit 125 judges that the untouched time period does not exceed the second predetermined time, it means that the user is near the touch device 12 and not far away from the touch device 12. Then, the step D and the step E are repeatedly done by the controlling unit 125 until the untouched time period exceeds the second predetermined time. Once the controlling unit 125 judges that the untouched time period exceeds the second predetermined time, the controlling unit 125 will control the warning unit 123 to issue the warning signal S2 (e.g. a warning sound) in order to the warn the user that the touch pen 11 is not carried. According to the warning signal S2, the user may take back the touch pen 11. It is noted that the second predetermined time may be set according to the practical requirements. For example, the second predetermined time may be set as a short time. Correspondingly, even if the touch pen 11 is separated from the touch device 12 by a short distance, the warning signal may be issued to warn the user earlier.

In addition to the above two situations, another situation has to be taken into consideration. If the controlling unit 125 judges that the untouched time period does not exceed the second predetermined time (i.e. in the step E) and the controlling unit 125 judges that the touch device 12 is not moved (i.e. in the step D), the reason for this situation may be that when the user carrier the touch device 12 and leaves, the user remembers the touch pen 11 not to be carried with. Then the user goes back to the location of the touch pen 11 to take back the touch pen 11. Under this circumstance, the step F is performed by the controlling unit 125, and the warning signal S2 is not generated. Then, the controlling unit 125 performs the step A again and implementing the subsequent judging mechanisms again. As a consequence, the possibility of causing erroneous judgment will be minimized.

More especially, the wireless signal S1 outputted from the first wireless transmission module 111 contains a capacity information of the battery 112. After the capacity information is received by the second wireless transmission module 122, the information of the battery capacity is displayed on the touch screen 121 to be viewed by the user. Consequently, the user can realize the residual capacity of the battery 112 of the touch pen 11. If necessary, the user may replace the battery 112 in order to avoid the erroneous judgment that is caused by the capacity depletion of the battery 112.

From the above descriptions, the present invention provides a touch device warning method and a touch device warning system. If the controlling unit judges that the touch pen is not used, the controlling unit further judges whether the touch device is moved. If the controlling unit judges that the touch device is moved, a warning signal is issued to warn the user of taking back the touch pen. As a consequence, the problem of losing the touch pen can be solved.

Figure 3:
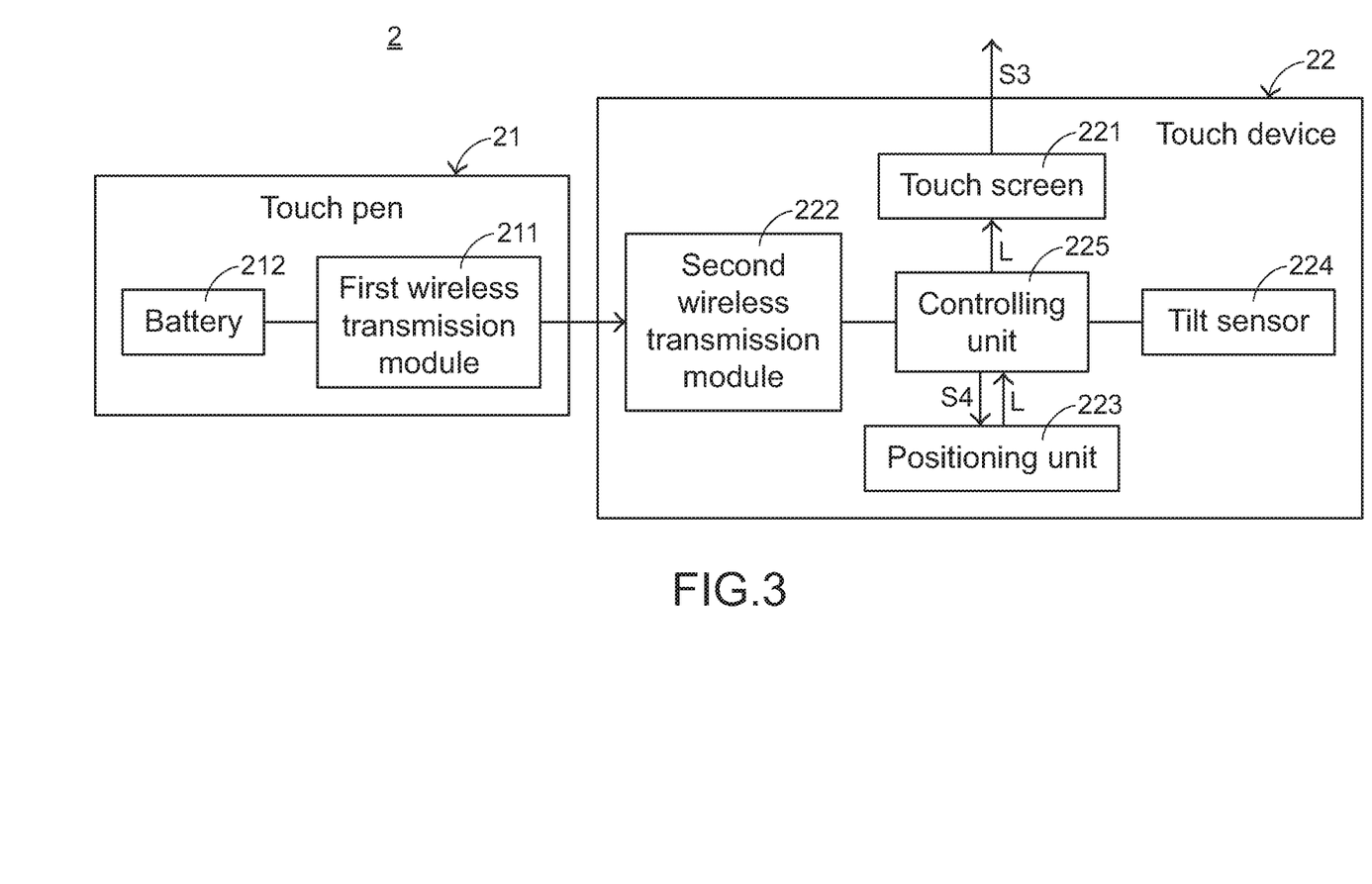
FIG. 3 is a schematic functional block diagram illustrating the architecture of a touch device warning system according to a second embodiment of the present invention.

The present invention further comprises a second embodiment. FIG. 3 is a schematic functional block diagram illustrating the architecture of a touch device warning system according to a second embodiment of the present invention. As shown in FIG. 3, the touch device warning system 2 comprises a touch pen 21 and a touch device 22. The touch pen 21 comprises a first wireless transmission module 211 and a battery 212. The touch device 22 comprises a touch screen 221, a second wireless transmission module 222, a positioning unit 223, a tilt sensor 224, and a controlling unit 225.

Except for the following three items, the configurations of the touch device warning system 2 of this embodiment are substantially identical to those of the touch device warning system 1 of the first embodiment, and are not redundantly described herein. Firstly, the touch device warning system 2 of this embodiment further comprises the positioning unit 223. The positioning unit 223 is disposed within the touch device 22 and connected with the controlling unit 225. The positioning unit 223 is used for detecting a position of the controlling unit 225, thereby obtaining a position information L. Secondly, the touch screen 221 further has the function of the warning unit. That is, a warning signal S3 outputted from the warning unit is a display message, which is shown on the touch screen 221 in order to be viewed by the user. Thirdly, the judging mechanisms of the controlling unit 225 are distinguished. The operations of the positioning unit 223 and the judging mechanisms of the controlling unit 225 will be illustrated later.

Figure 4:
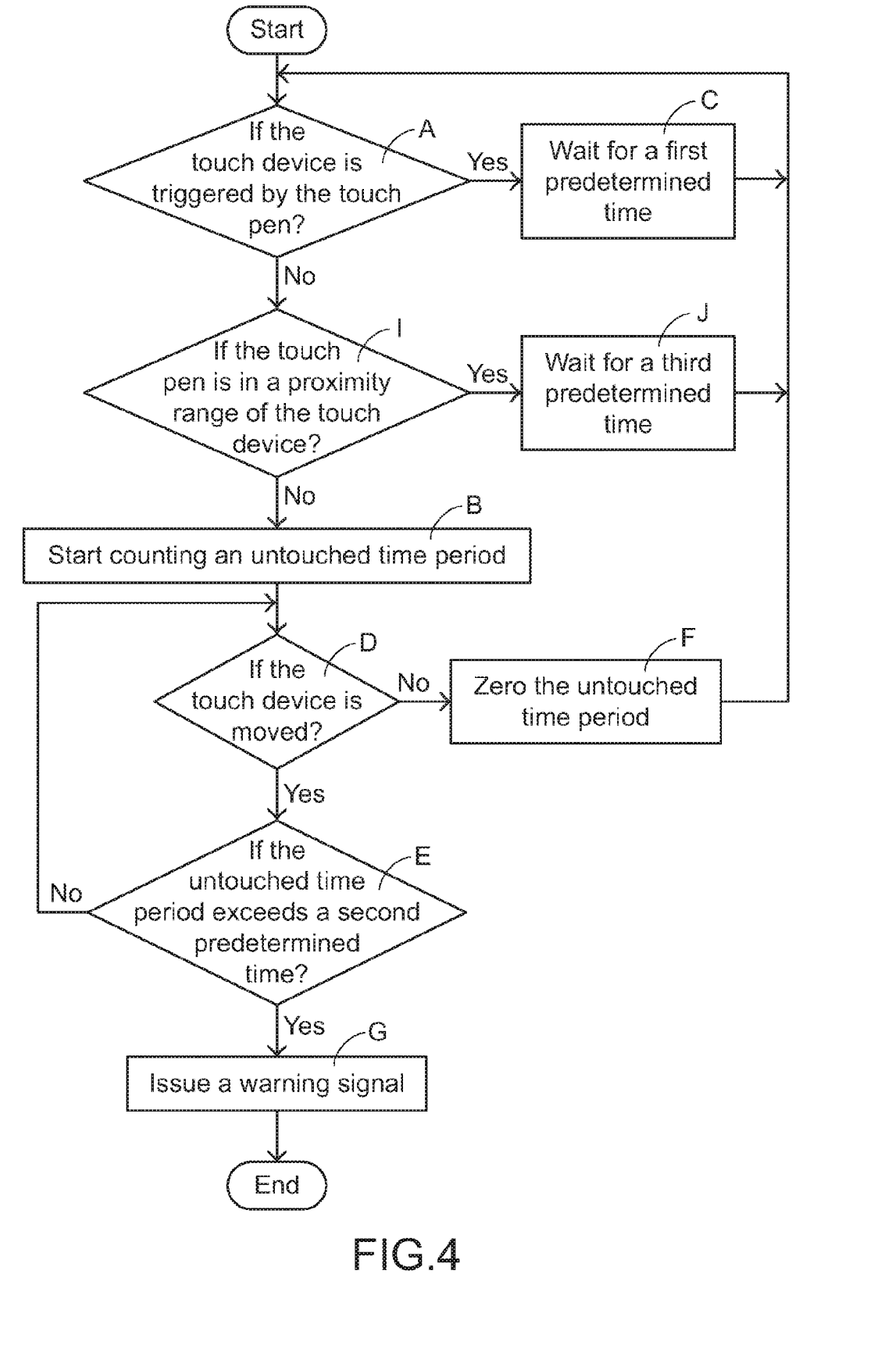
FIG. 4 is a flowchart illustrating a touch device warning method according to the second embodiment of the present invention.

Hereinafter, a touch device warning method according to a second embodiment of the present invention will be illustrated with reference to FIGS. 3 and 4. FIG. 4 is a flowchart illustrating a touch device warning method according to a second embodiment of the present invention. The touch device warning method according to the second embodiment of the present invention comprises the following steps:

Step A: judge whether the touch device is triggered by the touch pen;

Step I: judge whether the touch pen is in a proximity range of the touch device;
Step J: wait for a third predetermined time;
Step B: start counting an untouched time period;
Step C: wait for a first predetermined time;
Step D: judge whether the touch device is moved;
Step E: judge whether the untouched time period exceeds a second predetermined time;
Step F: zero the untouched time period; and
Step G: issue a warning signal.

In comparison with the touch device warning method of the first embodiment, the touch device warning method of this embodiment further comprises the step I and the step J. The other steps of the touch device warning method of this embodiment are substantially identical to those of the touch device warning method of the first embodiment, and are not redundantly described herein.

The operations of the touch device warning method implemented by the touch device warning system according to the second embodiment of the present invention will be illustrated in more details as follows. Please refer to FIGS. 3 and 4 again. When the user employs the touch pen 21 to touch the touch screen 221 in order to operate the touch device 22, the touch device warning method is started. According to the operation signal generated by the touch screen 221, the controlling unit 225 judges whether the touch device 22 is triggered by the touch pen 21 (i.e. the step A). If the controlling unit 225 judges that the touch screen 221 is triggered by the touch pen 21, the controlling unit 225 performs the step C and then performs the step A again. If the controlling unit 225 judges that the touch screen 221 is not triggered by the touch pen 21, the controlling unit 225 will judge whether the touch pen 21 is in the proximity range of the touch device 22 by detecting whether the wireless signal S1 is received by the second wireless transmission module 222 (i.e. the step I). In this context, the term "proximity range" denotes a communicable range between the first wireless transmission module 211 and the second wireless transmission module 222. For example, the communicable range is about 10 meters.

If the touch pen 21 is not moved away from the touch device 22, the wireless signal S1 can be received by the second wireless transmission module 222. Since the wireless signal S1 can be received by the second wireless transmission module 222, the controlling unit 225 judges that the touch pen 21 is in the proximity range of the touch device 22. After the controlling unit 225 waits for the third predetermined time (e.g. 10 second), the step A is performed again. On the other hand, if the touch pen 21 or the touch device 22 is moved by the user and the distance between the touch pen 21 and the touch device 22 is longer than the proximity range, the wireless signal S1 cannot be received by the second wireless transmission module 222. Since the wireless signal S1 cannot be received by the second wireless transmission module 222, the controlling unit 225 judges that the touch pen 21 is not in the proximity range of the touch device 22. Under this circumstance, the step B is performed. The subsequent steps are similar to those of the touch device warning method of the first embodiment, and are not redundantly described herein.

The following two aspects should be further described. Firstly, after the step A, the step I, the step B, the step D and the step E are sequentially performed by the controlling unit 225, if the controlling unit 225 judges that the untouched time period just exceeds the second predetermined time, the controlling unit 225 may simultaneously issue a request signal S4 to the positioning unit 223. After the request signal S4 is received by the positioning unit 223, the positioning unit 223 issues the position information L to the controlling unit 225. The position information L is a message about the address of the positioning unit 223 at the time when the request signal S4 is received by the positioning unit 223. Then, the position information L is transmitted from the controlling unit 225 to the touch screen 221. In addition, the controlling unit 225 controls the touch screen 221 (i.e. the warning unit) to issue the warning signal S3. The warning signal S3 contains the position information L. By viewing the address message of the position information L, the user may go to the address and the search the lost or forgotten touch pen 21 in the vicinity of the address.

Secondly, since the touch device warning method of this embodiment further comprises the step I and the step J, the possibility of causing erroneous judgment is further reduced. For example, after the touch pen 21 is used by the user, the touch pen 21 may be placed at a location beside the touch device 22. Since the wireless signal S1 can still be received by the second wireless transmission module 222, the controlling unit 225 judges that the touch pen 21 is in the proximity range of the touch device 22. Under this circumstance, the controlling unit 225 will not control the touch screen 221 to issue the warning signal S3. Consequently, the erroneous judgment is avoided.

From the above descriptions, the present invention provides a touch device warning method and a touch device warning system. If the controlling unit judges that the touch pen is not used, the controlling unit further judges whether the touch pen is in the proximity range of the touch device and then judges whether the touch device is moved. If the controlling unit judges that the touch device is moved, a warning signal is issued to warn the user of taking back the touch pen. As a consequence, the problem of losing the touch pen can be solved. In other words, the touch device warning method and the touch device warning system of the present invention provide multiple judgment mechanisms for avoiding occurrence of the erroneous judgment.

Figure 5:
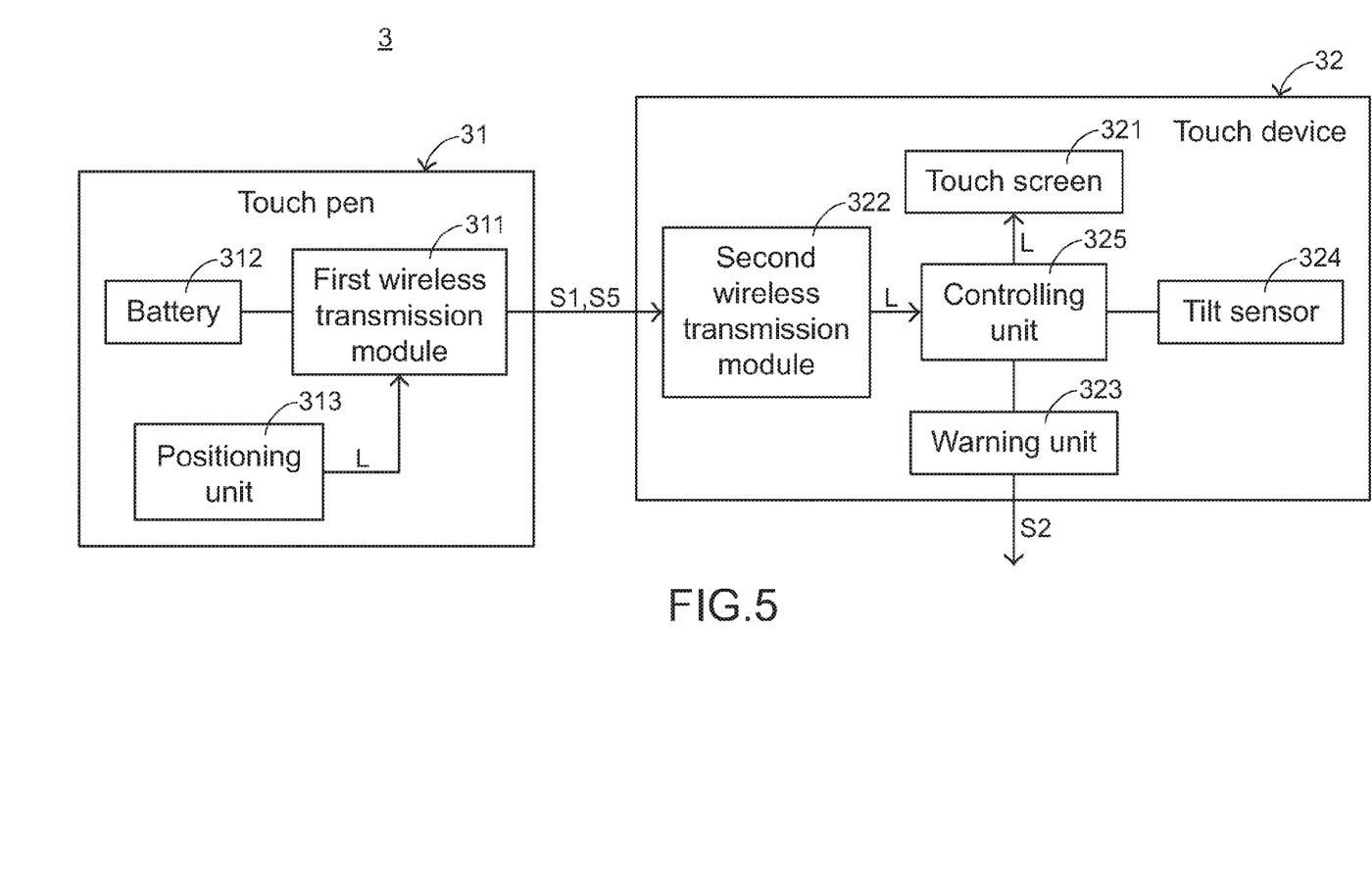
FIG. 5 is a schematic functional block diagram illustrating the architecture of a touch device warning system according to a third embodiment of the present invention.

The present invention further comprises a third embodiment. FIG. 5 is a schematic functional block diagram illustrating the architecture of a touch device warning system according to a third embodiment of the present invention. As shown in FIG. 5, the touch device warning system 3 comprises a touch pen 31 and a touch device 32. The touch pen 31 comprises a first wireless transmission module 311, a battery 312, and a positioning unit 313. The touch device 32 comprises a touch screen 321, a second wireless transmission module 322, a warning unit 323, a tilt sensor 324, and a controlling unit 325. Except for the following two items, the structures of the touch device warning system 3 of this embodiment are substantially identical to those of the touch device warning system 1 of the first embodiment, and are not redundantly described herein. Firstly, the touch device warning system 3 of this embodiment further comprises the positioning unit 313. The positioning unit 313 is disposed within the touch pen 32 and connected with the first wireless transmission module 311. The positioning unit 313 is used for detecting a position of the touch pen 31, thereby obtaining a position information L. Secondly, the judging mechanisms of the controlling unit 325 are distinguished. The operation of the positioning units 313 and the judging mechanisms of the controlling unit 315 will be illustrated later.

Figure 6:
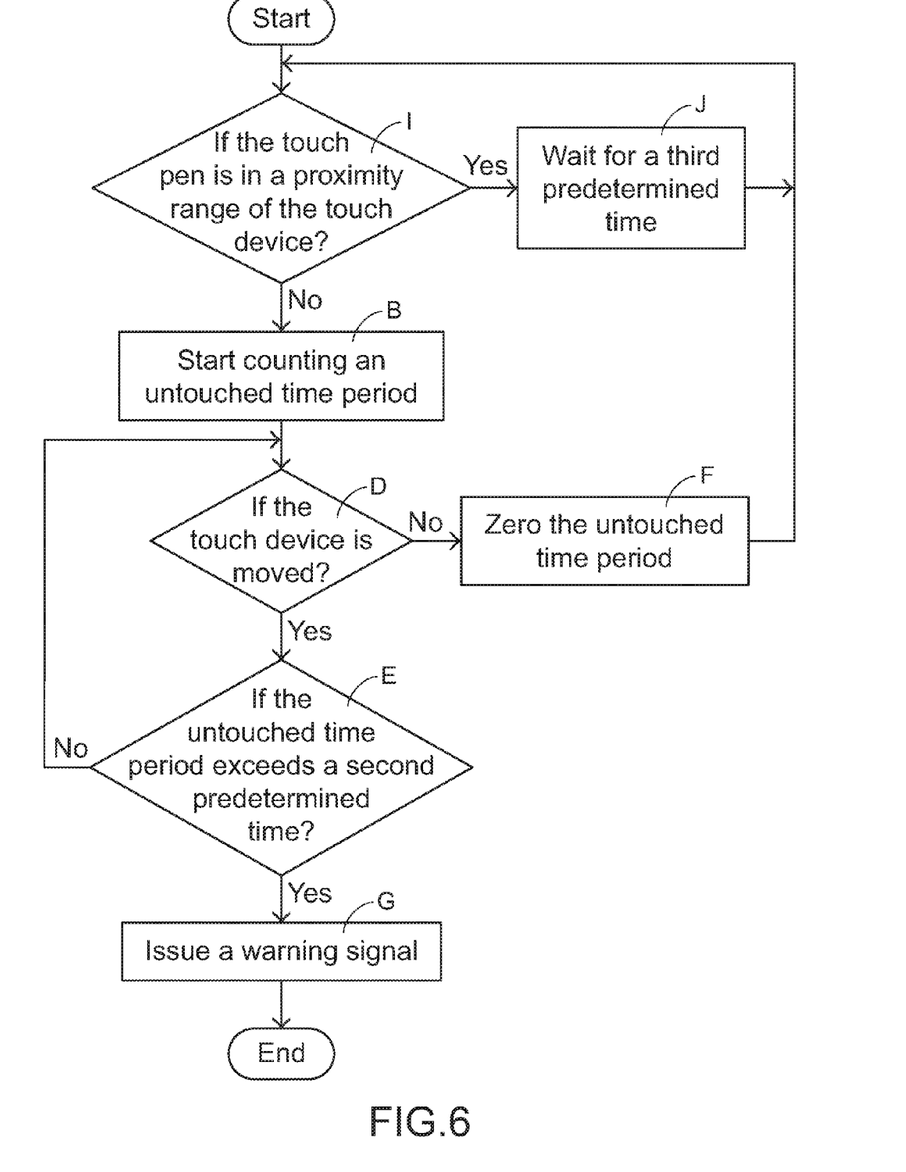
FIG. 6 is a flowchart illustrating a touch device warning method according to the third embodiment of the present invention.

Hereinafter, a touch device warning method according to a third embodiment of the present invention will be illustrated with reference to FIGS. 5 and 6. FIG. 6 is a flowchart illustrating a touch device warning method according to a third embodiment of the present invention. The touch device warning method according to the third embodiment of the present invention comprises the following steps:

Step I: judge whether the touch pen is in a proximity range of the touch device;
Step J: wait for a third predetermined time;
Step B: start counting a departure time period;
Step D: judge whether the touch device is moved;
Step E: judge whether the departure time period exceeds a second predetermined time;
Step F: zero the untouched time period; and
Step G: issue a warning signal.

Please refer to FIG. 6 again. In the step I, if the touch pen is in the proximity range of the touch device, the step J is performed. Whereas, if the touch pen is not in the proximity range of the touch device, the step B is performed. In the step D, if the touch device is not moved, the step F is performed. Whereas, if the touch device is moved, the step E is performed. In the step E, if the departure time period does not exceed the second predetermined time, the step D is performed again. Whereas, if the departure time period exceeds the second predetermined time, the step G is performed.

The operations of the touch device warning method implemented by the touch device warning system according to the third embodiment of the present invention will be illustrated in more details as follows. Please refer to FIGS. 5 and 6 again. After the touch device 32 is no longer used and the touch pen 31 and the touch device 32 are placed on a desk surface, the touch device warning method is started. Then, the controlling unit 325 judges whether the touch pen 31 is in the proximity range of the touch device 32 (i.e. the step I). Meanwhile, since the touch pen 31 is not moved away from the touch device 32, the wireless signal S1 can still be received by the second wireless transmission module 322. Since the wireless signal S1 can be received by the second wireless transmission module 322, the controlling unit 325 judges that the touch pen 31 is in the proximity range of the touch device 32. After the controlling unit 325 waits for the third predetermined time (e.g. 10 second), the step I is performed again. On the other hand, if the touch pen 31 or the touch device 32 is moved by the user and the distance between the touch pen 31 and the touch device 32 is longer than the proximity range, the wireless signal S1 cannot be received by the second wireless transmission module 322. Since the wireless signal S1 cannot be received by the second wireless transmission module 322, the controlling unit 325 judges that the touch pen 31 is not in the proximity range of the touch device 32. Under this circumstance, the step B is performed. The subsequent steps are similar to those of the touch device warning method of the first embodiment, and are not redundantly described herein.

Moreover, after the step I, the step B, the step D and the step E and the step G are sequentially performed by the controlling unit 325, the controlling unit 325 will control the warning unit 323 to issue the warning signal S2. For example, the warning signal S2 is a warning sound. Moreover, in the step I, if the touch pen 31 is moved away from the proximity range of the touch device 32 and the wireless signal S1 from the first wireless transmission module 311 cannot be received by the second wireless transmission module 322, the first wireless transmission module 311 cannot receive a response signal (not shown) from the second wireless transmission module 322. Since the response signal cannot be received by the first wireless transmission module 311, the first wireless transmission module 311 judges that the touch pen 31 is departed from the proximity range of the touch device 32. Meanwhile, the positioning unit 313 issues a position information L to the first wireless transmission module 311, and the first wireless transmission module 311 issues a position signal S5. The position signal S5 contains the position information L. The position information L denotes an actual address of the touch pen 31. Meanwhile, since the touch pen 31 is moved away from the touch device 32, the position signal S5 cannot be received by the second wireless transmission module 322. After the warning signal S2 from the warning unit 323 is realized by the user, the user may search the touch pen 31. Once the user is moved and the touch pen 31 is moved into the proximity range of the touch device 32, the position signal S5 can be received by the second wireless transmission module 322. In addition, the position information L is transmitted to the touch screen 321 through the second wireless transmission module 322 and the controlling unit 325. Consequently, the position information L is displayed on the touch screen 321. By viewing the position information L, the user may acquire the actual address of the touch pen 31 and go to the actual address to take back the touch pen 31.

It is noted that numerous modifications and alterations may be made while retaining the teachings of the invention. For example, in some other embodiments, the touch device further comprises another positioning unit for implementing the similar functions as described in the second embodiment in order to help the user to approach the actual address of the touch pen.

From the above descriptions, the touch device warning method and the touch device warning system of the present invention provide multiple judgment mechanisms for avoiding occurrence of the erroneous judgment. The multiple judgment mechanisms comprise the mechanism of judging whether the touch device is triggered by the touch pen, judging whether the touch pen is in the proximity range of the touch device, the mechanism of judging whether the touch device is moved and the mechanism of judging whether the untouched time period or the departure time exceeds a predetermined time. By the multiple judgment mechanisms, the touch device warning method and the touch device warning system of the present invention can avoid occurrence of the erroneous judgment. In other words, the touch device warning method and the touch device warning system of the present invention can effectively solve the drawbacks encountered from the conventional technologies.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch device warning method for a touch device, the touch device being in wireless communication with a touch pen, the touch device warning method comprising steps of:
judging whether the touch device is triggered by the touch pen, wherein in the step of judging whether the touch device is triggered by the touch pen, if a judging result indicates that the touch device is triggered by the touch pen, the touch device warning method further comprises a step of waiting for a first predetermined time and then judging again whether the touch device is triggered by the touch pen, wherein if the judging result indicates that the touch device is not triggered by the touch pen, the touch device warning method further comprises a step of starting counting an untouched time period;

if the touch device is not triggered by the touch pen, judging whether the touch device is moved, wherein in the step of judging whether the touch device is moved, if a judging result indicates that the touch device is not moved, the touch device warning method further comprises a step of zeroing the untouched time period, wherein if the judging result indicates that the touch device is moved, the touch device warning method further comprises a step of judging whether the untouched time period exceeds a second predetermined time; and if the touch device is moved, issuing a warning signal.

2. The touch device warning method according to claim wherein in the step of judging whether the untouched time period exceeds the second predetermined time, if a judging result indicates that the untouched time period does not exceed the second predetermined time, the step of judging whether the touch device is moved is performed again, wherein if the judging result indicates that the untouched time period exceeds the second predetermined time, the warning signal is issued.

3. The touch device warning method according to claim 1, wherein in the step of judging whether the touch device is triggered by the touch pen, if a judging result indicates that the touch device is triggered by the touch pen, the touch device warning method further comprises a step of waiting for a first predetermined time and then judging again whether the touch device is triggered by the touch pen, wherein if the judging result indicates that the touch device is not triggered by the touch pen, the touch device warning method further comprises a step of judging whether the touch pen is in a proximity range of the touch device.

4. The touch device warning method according to claim 3, wherein in the step of judging whether the touch pen is in the proximity range of the touch device, the touch device warning method further comprises a step of waiting for a third predetermined time and then judging again whether the touch device is triggered by the touch pen, wherein if the judging result indicates that the touch pen is not in the proximity range of the touch device, the touch device warning method further comprises steps of starting counting an untouched time period and judging whether the touch device is moved.

5. The touch device warning method according to claim 4, wherein in the step of judging whether the untouched time period exceeds the second predetermined time, if a judging result indicates that the untouched time period does not exceed the second predetermined time, the step of judging whether the touch device is moved is performed again, wherein if the judging result indicates that the untouched time period exceeds the second predetermined time, the warning signal is issued.

6. The touch device warning method according to claim 1, wherein the warning signal is a warning sound, a warning message, a flickering light or an address message about a position of the touch pen.

\* \* \* \* \*